United States Patent
Nazaran et al.

(10) Patent No.: US 9,650,467 B2
(45) Date of Patent: May 16, 2017

(54) POLYURETHANEUREAS FOR WOOD COATINGS

(71) Applicant: Covestro Deutschland AG, Leverkusen (DE)

(72) Inventors: Pantea Nazaran, Köln (DE); Rolf Gertzmann, Leverkusen (DE); Juan Miguel Garcia Martinez, Barcelona (ES); Maria Almato Guiteras, Barcelona (ES); Eva Tejada, Mollet del Valles (ES)

(73) Assignee: Covestro Deutschland AG, Leverkusen (DE)

( * ) Notice: Subject to any disclaimer, the term of this patent is extended or adjusted under 35 U.S.C. 154(b) by 0 days.

(21) Appl. No.: 14/940,729

(22) Filed: Nov. 13, 2015

(65) Prior Publication Data
US 2016/0137773 A1 May 19, 2016

(30) Foreign Application Priority Data
Nov. 17, 2014 (EP) ..................................... 14193397

(51) Int. Cl.
*C08G 18/42* (2006.01)
*C08G 18/75* (2006.01)
*C08G 18/66* (2006.01)
*C08G 18/08* (2006.01)
*C08G 18/12* (2006.01)
*C09D 175/02* (2006.01)
*C08G 18/32* (2006.01)
*C09D 175/06* (2006.01)

(52) U.S. Cl.
CPC ....... *C08G 18/755* (2013.01); *C08G 18/0814* (2013.01); *C08G 18/12* (2013.01); *C08G 18/3206* (2013.01); *C08G 18/3234* (2013.01); *C08G 18/3275* (2013.01); *C08G 18/4202* (2013.01); *C08G 18/4211* (2013.01); *C08G 18/4238* (2013.01); *C08G 18/664* (2013.01); *C08G 18/6655* (2013.01); *C09D 175/02* (2013.01); *C09D 175/06* (2013.01); *C08G 2150/00* (2013.01)

(58) Field of Classification Search
CPC .. C08G 18/755; C08G 18/0814; C08G 18/12; C08G 18/3206; C08G 18/3234; C08G 18/4202; C08G 18/4238; C08G 18/4211; C08G 18/664; C08G 18/6655; C09D 175/02; C09D 175/06
See application file for complete search history.

(56) References Cited

U.S. PATENT DOCUMENTS

| | | | |
|---|---|---|---|
| 5,684,081 A | 11/1997 | Dannhorn et al. | |
| 2005/0153865 A1* | 7/2005 | Detering | C08G 18/0819 510/475 |
| 2005/0209399 A1* | 9/2005 | Munzmay | C08G 18/0828 524/589 |
| 2009/0264577 A1* | 10/2009 | Blum | C08G 18/0823 524/501 |

FOREIGN PATENT DOCUMENTS

EP 753531 A1 1/1997

* cited by examiner

*Primary Examiner* — Michael L Leonard
(74) *Attorney, Agent, or Firm* — Drinker Biddle & Reath LLP

(57) ABSTRACT

The invention relates to a cationically hydrophilized polyurethaneurea characterized in that it is synthesized from
  a) at least one aliphatic, araliphatic and/or cycloaliphatic polyisocyanate,
  b) polyols having a number-average molecular weight $Mn \geq 400$ and $\leq 6000$ g/mol and a hydroxyl functionality of $\geq 1.5$ and $\leq 4$, comprising at least one polyester polyol b1), which has an amorphous structure and which comprises as synthesis component at least one aromatic dicarboxylic acid and/or the corresponding carboxylic anhydride, the fraction of aromatic dicarboxylic acids and/or their anhydrides in the polyester polyol being $\geq 35$ wt %, based on the overall mass of the polyester polyol,
  c) at least one cationically hydrophilizing component which has at least one group that is reactive towards isocyanate groups, and has at least one cationic or potentially cationic group,
  d) at least one aliphatic, amino-functional compound which has at least two isocyanate-reactive amino groups,
  e) optionally at least one alcohol which has at least two hydroxyl groups and a molar mass $\geq 60$ and $\leq 399$ g/mol and
  f) optionally at least one compound which has a group that is reactive towards isocyanate groups.

The invention further relates to an aqueous dispersion comprising the polyurethaneurea and to a coating composition comprising the polyurethaneurea or the corresponding aqueous dispersion. Further subjects of the invention are a method for coating substrates using the coating composition of the invention, and the coated substrate obtainable in such a method.

12 Claims, No Drawings

POLYURETHANEUREAS FOR WOOD COATINGS

CROSS-REFERENCE TO RELATED APPLICATIONS

This application claims priority to European Application No. 14193397.8, filed Nov. 17, 2014, which is incorporated herein by reference in its entirety.

The present invention relates to a specific polyurethaneurea, and also to an aqueous dispersion comprising the polyurethaneurea and to a coating composition comprising the polyurethaneurea or the corresponding aqueous dispersion. Further subjects of the invention are a method for coating substrates using the coating composition of the invention, and the coated substrate obtainable in such a method.

BACKGROUND OF THE INVENTION

In the coating of substrates, aqueous binders, especially polyurethaneurea (PUR) dispersions, are increasingly being used. A particular feature of PUR dispersions relative to many other classes of aqueous binder is a high level of resistance to chemicals and water, high mechanical robustness, and high tensile strength and elasticity. These requirements are largely met by prior-art polyurethane-polyurea dispersions. By virtue of hydrophilic groups, the systems identified in the prior art may be self-emulsifying, meaning that they can be dispersed in water without assistance from external emulsifiers. For this purpose, ionically or nonionically hydrophilizing groups are incorporated into the polymer frameworks of the polyurethaneureas.

For the coating of wood, moreover, the coating composition is required to meet a number of further properties, such as rapid drying, great enhancement of the wood structure, effective and rapid sandability, all nevertheless with high hardness, scratch resistance and resistance to substances in everyday use that contain oils or fats, such as hand cream, for example. Consequently there is a continual demand for suitable coating compositions for wood, based on aqueous binders, to be improved in respect of these qualities.

BRIEF SUMMARY OF THE INVENTION

It was an object of the present invention, therefore, to provide a polyurethaneurea which is suitable for producing wood-coating compositions based on aqueous PUR dispersions, which possess rapid initial drying and high hardness, in conjunction with effective sandability and resistance to oil- or fat-containing substances in everyday use, such as hand cream, for example.

This object has been achieved in accordance with the invention by a cationically hydrophilized polyurethaneurea which is synthesized from a) at least one aliphatic, araliphatic and/or cycloaliphatic polyisocyanate,
b) polyols having a number-average molecular weight $M_n \geq 400$ and $\leq 6000$ g/mol and a hydroxyl functionality of $\geq 1.5$ and $\leq 4$, comprising at least one polyester polyol b1), which has an amorphous structure and which comprises as synthesis component at least one aromatic dicarboxylic acid and/or the corresponding carboxylic anhydride, the fraction of aromatic dicarboxylic acids and/or their anhydrides in the polyester polyol being $\geq 35$ wt %, based on the overall mass of the polyester polyol,
c) at least one cationically hydrophilizing component which has at least one group that is reactive towards isocyanate groups, and has at least one cationic or potentially cationic group,
d) at least one aliphatic, amino-functional compound which has at least two isocyanate-reactive amino groups,
e) optionally at least one alcohol which has at least two hydroxyl groups and a molar mass $\geq 60$ and $\leq 399$ g/mol and
f) optionally at least one compound which has a group that is reactive towards isocyanate groups.

DETAILED DESCRIPTION OF THE INVENTION

Wood-coating compositions based on aqueous dispersions of the polyurethaneurea of the invention point exhibit rapid drying, high hardness and also, in spite of this, effective sandability and resistance to substances in everyday use such as hand cream, for example.

In accordance with the invention, a cationically hydrophilized polyurethaneurea is a polyurethaneurea which has cationic or potentially cationic groups bonded to the polymer framework. Potentially cationic groups are those which can be converted into a cationic group by chemical reaction, especially by neutralization.

The polyurethaneureas of the invention preferably have a cationic and/or potentially cationic group content of $\geq 0.2$ and $\leq 5$ milliequivalents per g of polymer, more preferably of $\geq 0.5$ and $\leq 2$ milliequivalents per g of polymer and very preferably of $\geq 0.6$ and $\leq 1$ milliequivalent per g of polymer.

In one preferred embodiment of the invention, the polyurethaneurea has no nonionically hydrophilizing groups.

Nonionically hydrophilizing groups are understood in particular to be those which are introduced into the polyurethaneurea via nonionically hydrophilizing compounds which have isocyanate-reactive groups. Examples of such nonionically hydrophilizing compounds are polyoxyalkylene ethers which include at least one hydroxyl or amino group. These polyethers preferably include a fraction of 30 wt % to 100 wt % of units derived from ethylene oxide.

Nonionically hydrophilizing compounds also include, for example, monohydric polyalkylene oxide polyether alcohols having on average 5 to 70, preferably 7 to 55, ethylene oxide units per molecule, of the kind available conventionally by alkoxylation of suitable starter molecules.

The polyalkylene oxide polyether alcohols are either pure polyethylene oxide polyethers or mixed polyalkylene oxide polyethers at least 30 mol %, preferably at least 40 mol %, of whose alkylene oxide units consist of ethylene oxide units. Preferred nonionic compounds are monofunctional mixed polyalkylene oxide polyethers which have at least 40 mol % of ethylene oxide units and not more than 60 mol % of propylene oxide units.

Polyurethaneureas in the sense of the invention are polymeric compounds which have at least two, preferably at least three, urethane-group-containing repeating units

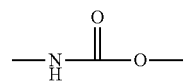

and also, moreover, urea-group-containing repeating units:

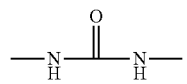

The urea groups here are formed preferably by the reaction of ioscyanate-functional polyurethane prepolymers with compounds having amino groups The polyurethaneurea of the invention may also comprise further synthesis components, but is preferably synthesized exclusively from components a) to f) and more exclusively from components a) to e).

For the purposes of this invention, groups that are reactive toward isocyanate groups are, in particular, primary and secondary amino groups, hydroxyl groups and/or thiol groups.

The number-average molecular weight, for the purposes of this specification, is always determined by gel permeation chromatography (GPC) in tetrahydrofuran at 23° C. The procedure is as per DIN 55672-1: "Gel permeation chromatography, Part 1—Tetrahydrofuran as Eluent" (SECurity GPC-System from PSS Polymer Service, flow rate 1.0 ml/min; columns: 2×PSS SDV linear M, 8×300 mm, 5 μm; RID detector). Polystyrene samples of known molar mass are used for calibration. Calculation of the number-average molecular weight takes place with software assistance. Baseline points and evaluation limits are specified in line with DIN 55672 Part 1.

Component a) comprises at least one aliphatic, araliphatic and/or cycloaliphatic polyisocyanate.

Examples of compounds suitable as component a) are 1,4-butylene diisocyanate, 1,5-pentamethylene diisocyanate (PDI), 1,6-hexamethylene diisocyanate (HDI), isophorone diisocyanate (IPDI), 2,2,4- and/or 2,4,4-trimethylhexamethylene diisocyanate, the isomeric bis(4,4'-isocyanatocyclohexyl)methanes or mixtures thereof with any desired isomer content (H12-MDI), 1,4-cyclohexylene diisocyanate, 4-isocyanatomethyl-1,8-octane diisocyanate (nonane triisocyanate), 1,3- and/or 1,4-bis(2-isocyanatoprop-2-yl)benzene (TMXDI), 1,3-bis(isocyanato-methyl)benzene (XDI) and also alkyl 2,6-diisocyanatohexanoates (lysine diisocyanates) having C1-C8-alkyl groups, and also mixtures thereof.

Besides the abovementioned polyisocyanates, it is also possible to make proportional accompanying use of modified diisocyanates or triisocyanates having isocyanurate, urethane, allophanate, biuret, iminooxadiazinedione and/or oxadiazinetrione structure.

The compounds in question are preferably polyisocyanates or polyisocyanate mixtures of the aforementioned kind having an average NCO functionality of $\geq 2$ and $\leq 4$, preferably $\geq 2$ to 2.6 and more preferably $\geq 2$ and $\leq 2.4$.

Preferred for use as component a) are HDI, H12-MDI and/or IPDI.

With particular preference, component a) comprises $\geq 90$ wt %, more preferably $\geq 95$ wt % and especially preferably 100 wt % of IPDI, based on the overall mass of component a).

The fraction of component a) in the polyurethaneurea is preferably $\geq 5$ and $\leq 75$ wt %, more preferably $\geq 10$ and $\leq 65$ wt % and very preferably $\geq 20$ and $\leq 55$ wt %, based on the total weight of the polyurethaneurea. Components a) to f) add up to 100 wt %.

Component b) preferably has a number-average molecular weight of $\geq 600$ and $\leq 4000$ g/mol, more preferably of $\geq 800$ and $\leq 3000$ g/mol and/or an average OH functionalities of $\geq 1.8$ and $\leq 3$ and more preferably of $\geq 1.9$ and $\leq 2.1$.

As component b), besides the polyester polyols b1), it is possible in particular to use polyester polyols, polyether polyols, polycarbonate polyols, polyether-polycarbonate polyols and/or polyester-polycarbonate polyols. Preferably polyester polys are used exclusively as component b).

Polyester polyols are, for example, the conventional polycondensates of diols and also optionally triols and tetraols and of dicarboxylic and also optionally tricarboxylic and tetracarboxylic acids or hydroxycarboxylic acids or lactones. In place of the free polycarboxylic acids it is also possible to use the corresponding polycarboxylic anhydrides or corresponding polycarboxylic esters of lower alcohols to prepare the polyesters.

Examples of diols suitable for this purpose are ethylene glycol, butylene glycol, diethylene glycol, triethylene glycol, polyalkylene glycols such as polyethylene glycol, and also 1,2-propanediol, 1,3-propanediol, butane-1,3-diol, butane-1,4-diol, hexane-1,6-diol and isomers, neopentyl glycol or hydroxypivalic acid neopentyl glycol ester. In addition it is also possible for polyols such as trimethylolpropane, glycerol, erythritol, pentaerythritol, trimethylolbenzene or trishydroxyethyl-isocyanurate to be used.

Dicarboxylic acids which can be used include phthalic acid, isophthalic acid, terephthalic acid, tetrahydrophthalic acid, hexahydrophthalic acid, cyclohexanedicarboxylic acid, adipic acid, azelaic acid, sebacic acid, glutaric acid, tetrachlorophthalic acid, maleic acid, fumaric acid, itaconic acid, malonic acid, suberic acid, 2-methylsuccinic acid, 3,3-diethylglutaric acid and/or 2,2-dimethylsuccinic acid. The corresponding anhydrides are another possible acid source for use.

Where the average functionality of the polyol for esterification is greater than 2, it is additionally possible to use monocarboxylic acids as well, such as benzoic acid and hexanecarboxylic acid.

Examples of hydroxycarboxylic acids which can be used as reaction participants in the preparation of a polyester polyol having terminal hydroxyl groups include hydroxycaproic acid, hydroxybutyric acid, hydroxydecanoic acid, hydroxystearic acid and the like. Suitable lactones are caprolactone, butyrolactone and homologues. Caprolactone is preferred.

The fraction of component b) in the polyurethaneurea is preferably $\geq 5$ and $\leq 70$ wt %, more preferably $\geq 10$ and $\leq 60$ wt % and very preferably $\geq 20$ and $\leq 50$ wt %, based on the overall weight of the polyurethaneurea. Components a) to f) add up to 100 wt %.

Component b) comprises at least one polyester polyol b1), which has an amorphous structure and which as synthesis component comprises at least one aromatic dicarboxylic acid and/or the corresponding carboxylic acid anhydride, the fraction of aromatic dicarboxylic acids and/or their anhydrides in the polyester polyol being $\geq 35$ wt %, based on the overall mass of the polyester polyol.

The polyester polyols b1) preferably have a glass transition point $T_g$, determined by means of DSC, of $\geq -25°$ C., more preferably $\geq 0°$ C. and $\leq 80°$ C. and very preferably $>10°$ C. and $\leq 50°$ C.

In the context of the invention, the glass transition temperature $T_g$ are determined by means of dynamic scanning calorimetry (DSC) in accordance with DIN EN 61006, Method A, using a DSC instrument (Pyris Diamond DSC calorimeter from Perkin-Elmer) which for determination of $T_g$ is calibrated with indium and lead. 10 mg of the substance for analysis are weighed out into a sealable aluminium crucible, which is sealed. Three immediate successive runs of a heatings from −100° C. to +150° C. are performed, heating rate 20 K/min, with subsequent cooling, cooling rate 320 K/min, and the third heating curve is used for determining the values. The $T_g$ is defined as the temperature at the mid-height of one glass transition step.

An amorphous structure for the purposes of this invention means that the polyester polyols do not form any crystalline fractions their structure, and so DSC measurements can reveal only one or more glass transition points $T_g$ for the polyester polyols, but not any melting points or melting ranges.

In one preferred embodiment of the invention, component b) comprises at least one polyester polyol b1) which comprises as synthesis component at least one aromatic dicarboxylic acid and/or the corresponding carboxylic anhydride. Suitable aromatic dicarboxylic acids or carboxylic anhydrides here are, in particular, phthalic acid, isophthalic acid or terephthalic acid, the corresponding anhydrides, and also mixtures of the stated compounds.

The fraction of aromatic dicarboxylic acids and/or their anhydrides in the polyester polyol is preferably ≥45 wt % and very preferably ≥70 wt %, based on the overall mass of the polyester polyol.

Mixtures of aliphatic and aromatic dicarboxylic acids and/or their anhydrides may be used as acid component for the preparation, though preferably aromatic dicarboxylic acids and/or anhydrides, and no aliphatic carboxylic acids and/or anhydrides, are used exclusively as acid component.

The polyester polyol b1) is preferably obtainable from acid and alcohol components, aromatic dicarboxylic acids exclusively being used as acid component.

The polyester polyol b1) preferably comprises as diol component ethylene glycol, 1,4-butanediol and/or 1,6-hexanediol, more preferably ethylene glycol.

The polyester polyol b1) is preferably synthesized exclusively from ethylene glycol, 1,4-butanediol and/or 1,6-hexanediol and phthalic acid and/or phthalic anhydride.

In one particularly preferred embodiment of the invention, component b) comprises not only the polyester polyol b1) but also a further polyester polyol b2).

The polyester polyol b2) comprises preferably as synthesis component at least one aliphatic dicarboxylic acid and/or the corresponding carboxylic anhydride. Employed with preference here as aliphatic dicarboxylic acid is adipic acid, optionally in a mixture with other aliphatic dicarboxylic acids and/or anhydrides.

The fraction of aliphatic dicarboxylic acids and/or their anhydrides in the polyester polyol b2) is preferably ≥40 wt %, more preferably ≥60 wt % and very preferably ≥70 wt %, based on the overall mass of the polyester polyol b2).

Preference is given to using exclusively aliphatic dicarboxylic acids and/or anhydrides, and no aromatic dicarboxylic acids and/or anhydrides, as acid component.

The polyester polyol b2) preferably comprises as diol component branched diols or diols with heteroatom substitution within the main chain, especially butylene glycol, diethylene glycol, triethylene glycol, polyalkylene glycols such as polyethylene glycol, and also 1,2-propanediol and/or neopentyl glycol, and very preferably diethylene glycol.

The polyester polyol b2) is preferably synthesized exclusively from branched diols or diols with heteroatom substitution within the main chain, especially preferably butylenes glycol, diethylenc glycol, triethylene glycol, polyalkylene glycols such as polyethylene glycol, and also 1,2-propanediol and/or neopentyl glycol, and from aliphatic dicarboxylic acids and/or their anhydrides, more preferably from diethylene glycol and adipic acid.

The polyester polyols b2) used preferably have an amorphous structure.

The polyester polyols b2) preferably have a glass transition point $T_g$, determined by means of DSC, of ≤0° C., more preferably ≤−15° C. and very preferably ≤−25° C.

The polyester polyols b1) and b2) are preferably in a b1:b2 weight ratio of 3:1 to 1:4 and more preferably of 2:1 to 1:3, and especially preferably 1:1 to 1:2.5. Particularly preferred is a weight ratio of b1:b2 from 1:2 to 2:1. In one particularly preferred embodiment, the polyester polyol b2) is present in excess.

Very preferably, component b) consists of the polyester polyol b1) or of the polyester polyols b1) and b2), especially preferably of the polyester polyols b1) and b2).

Component b) consists especially preferably of a polyester polyol b1) which comprises as acid component exclusively aromatic dicarboxylic acids and/or the corresponding anhydrides, and of a polyester polyol b2) which comprises as acid component aliphatic dicarboxylic acids and/or the corresponding anhydrides.

Component c) comprises at least one cationically hydrophilizing component which has at least one group that is reactive towards isocyanate groups, and has at least one cationic or potentially cationic group.

Component c) preferably has at least one tertiary amino group and/or an ammonium group. Examples of compounds suitable as component c) are tris(hydroxyalkyl)amines, N,N'-bis(hydroxyalkyl)alkylamines, N-hydroxyalkyldialkylamines, tris(aminoalkyl)amines, N,N'-bis(aminoalkyl)alkylamines, N-aminoalkyldialkylamines, and also mixtures thereof. The alkyl radicals here preferably have 2 to 6 carbon atoms.

Preferred for use as component c) are N,N'-bis(hydroxyalkyl)alkylamines. With particular preference they are selected from N-methyldiethanolamine, N-ethyldiethanolamine, N-propyldiethanolamine, N-methyldipropanlamine, N-ethyldiproopanolamine, N-propyldipropanolamine, and especially preferably component c) is N-methyldiethanolamine.

The tertiary amino groups present may be partly or completely neutralized by the addition of acids during or after the preparation of the polyurethaneurea. Acids used in that case are preferably phosphoric acid, sulphuric acid, halogen acids and/or organic acids such as lactic acid, formic acid and/or acetic acid, more preferably organic acids and very preferably acetic acid.

The fraction of component c) in the polyurethaneurea is preferably ≥1 and ≤25 wt %, more preferably ≥2 and ≤20 wt % and very preferably ≥5 and ≤15 wt %, based on the total weight of the polyurethaneurea. Components a) to f) add up to 100 wt %.

Component d) comprises at least one aliphatic, amino-functional compound which has at least two isocyanate-reactive amino groups.

The compounds of component d) preferably have no hydrophilizing groups, in particular no ionic and/or potentially ionic groups.

Compounds suitable as component d) are, in particular, primary and/or secondary di- or trifunctional amines, preferably primary and/or secondary difunctional amines.

Since component d) has two or more isocyanate-reactive amino groups, it serves preferably as a chain extender in order to build higher molecular weights.

Examples of suitable diamines and triamines are 1,2-ethanediamine, 1,6-hexamethylenediamine, 1-amino-3,3,5- trimethyl-5-aminomethylcyclohexane (isophoronediamine, IPDA), piperazine, 1,4-diaminocyclohexane, bis(4-aminocyclohexyl)methane and diethylenetriamines.

Preferred for use as component d) are 1,2-ethanediamine, 1-amino-3,3,5-trimethyl-5-aminomethylcyclohexane (TPDA) and/or diethylenetriamine.

With particular preference, component d) comprises ≥90 wt %, more preferably ≥95 wt % and especially preferably 100 wt % of IPDA, based on the overall mass of component d).

The fraction of component d) in the polyurethaneurea is preferably ≥0.5 and ≤20 wt %, more preferably ≥1 and ≤15 wt % and very preferably ≥2 and ≤12 wt %, based on the overall weight of the polyurethaneurea. Components a) to f) add up to 100 wt %.

The polyurethaneurea is further optionally synthesized from component e), one or more alcohols which have at least two hydroxyl groups and have a molar mass of ≥60 and ≤399 g/mol. For example, the polyols of the stated molar mass range with up to 20 carbon atoms may be used, such as ethylene glycol, diethylene glycol, triethylene glycol, 1,2-propanediol, 1,3-propanediol, 1,4-butanediol, 1,3-butylene glycol, cyclohexanediol, 1,4-cyclohexanedimethanol, 1,6-hexanediol, neopentyl glycol, hydroquinone dihydroxyethyl ether, bisphenol A (2,2-bis(4-bydroxyphenyl)propane), hydrogenated bisphenol A, (2,2-bis(4-hydroxycyclohexyl)propane), trimethylolpropane, glycerol, pentaerythritol, and also mixtures thereof.

In one preferred embodiment of the invention, component e) is used.

The compounds of component e) preferably have no ionically or nonionically hydrophilizing groups.

The fraction of component e) in the polyurethaneurea is preferably ≥0 and ≤10 wt %, more preferably ≥0.5 and ≤6 wt % and very preferably ≥1 and ≤4 wt %, based on the overall weight of the polyurethaneurea. Components a) to f) add up to 100 wt %.

Furthermore, the polyurethaneurea may be synthesized from component f), one or more compounds which have a group that is reactive towards isocyanate groups, more particularly compounds which have an amino or hydroxyl group. Examples of suitable compounds of component f) are methylamine, ethylamine, propylamine, butylamine, octylamine, laurylamine, stearylamine, isononyloxypropylamine, dimethylamine, diethylamine, dipropylamine, dibutylamine, N-methylaminopropylamine, diethyl(methyl)aminopropylamine, morpholine, piperidine, methanol, ethanol, isopropanol, n-propanol, n-butanol, ethylene glycol monobutyl ether, diethylene glycol monomethyl ether, diethylene glycol monobutyl ether, propylene glycol monomethyl ether, dipropylene glycol monomethyl ether, tripropylene glycol monomethyl ether, dipropylene glycol monopropyl ether, propylene glycol monobutyl ether, dipropylene glycol monobutyl ether, tripropylene glycol monobutyl ether, 2-ethylhexanol, 1-octanol, 1-dodecanol, I-hexadecanol.

The compounds of component f) preferably have no ionically or nonionically hydrophilizing groups.

The fraction of component f) in the polyurethaneurea is preferably ≥0 and ≤10 wt %, more preferably ≥0 and ≤3 wt % and very preferably 0, based on the overall weight of the polyurethaneurea. Components a) to f) add up to 100 wt %.

In one preferred embodiment of the invention, either component a) is IPDI or component d) is IPDA, or component a) is IPDI and component d) is IPDA.

With further preference the polyurethaneurea is synthesized from ≥10 and ≤65 wt % of component a), ≥5 and ≤70 wt % of component b), ≥2 and ≤20 wt % of component c), ≥1 and ≤15 wt % of component d), ≥0.5 and ≤6 wt % of component e) and ≥0 and ≤10 wt % of component f), based in each case on the overall mass of the polyurethaneurea, based in each case on the overall mass of the polyurethaneurea, with components a) to f) adding up to 100 wt %.

In one preferred embodiment of the invention, the polyurethaneurea used in accordance with the invention is synthesized from a) at least one aliphatic, araliphatic and/or cycloaliphatic polyisocyanate which is selected from HDI, H12-MDI and/or IPDI, b) one or more polyols having a number-average molecular weight Mn≥400 and ≤6000 g/mol and a hydroxyl functionality of ≥1.5 and ≤4, where component b) comprises at least one polyester polyol b1) which has an amorphous structure and is obtainable from acid and alcohol components, aromatic dicarboxylic acids being used exclusively as acid component, and a polyester polyol b2) which comprises as acid component aliphatic dicarboxylic acids or the corresponding anhydrides, c) at least one cationically hydrophilizing component which has at least one group that is reactive towards isocyanate groups, and has at least one tertiary amino group and/or an ammonium group, d) at least one aliphatic primary or secondary diamine which has two isocyanate-reactive amino groups and no ionic and/or potentially ionic groups, e) at least one alcohol which has at least two hydroxyl groups and a molar mass ≥60 and ≤399 g/mol and f) optionally at least one compound which has a group that is reactive towards isocyanate groups.

With further preference the polyurethaneurea of this embodiment is synthesized from ≥10 and ≤65 wt % of component a), ≥5 and ≤70 wt % of component b), ≥2 and ≤20 wt % of component c), ≥1 and ≤15 wt % of component d), ≥0.5 and ≤6 wt % of component e) and ≥0 and ≤10 wt % of component f), based in each case on the overall mass of the polyurethaneurea, based in each case on the overall mass of the polyurethaneurea, with components a) to f) adding up to 100 wt %.

With more particular preference the polyurethaneurea is synthesized exclusively from components a) to f).

In one particularly preferred embodiment of the invention, the polyurethaneurea used in accordance with the invention is synthesized from a) at least one aliphatic, araliphatic and/or cycloaliphatic polyisocyanate, component a) comprising ≥95% of IPDI, b) polyester polyol b1) which has an amorphous structure and is obtainable from acid and alcohol components, aromatic dicarboxylic acids being used exclusively as acid component, and polyester polyol b2) which comprises as acid component aliphatic dicarboxylic acids or the corresponding anhydrides, the polyester polyols having a number-average molecular weight Mn≥400 and ≤6000 g/mol and a hydroxyl functionality of ≥1.5 and ≤4, c) at least one cationically hydrophilizing component which is selected from N,N'-bis(hydroxyalkyl)alkylamines, d) at least one aliphatic, amino-functional compound which has at least two isocyanate-reactive amino groups, component a) comprising ≥95% of IPDA, e) at least one alcohol which has at least two hydroxyl groups and a molar mass ≥60 and ≤399 g/mol and f) optionally at least one compound which has a group that is reactive towards isocyanate groups, and which comprises no ionically or nonionically hydrophilizing groups.

With further preference the polyurethaneurea of the above embodiment is synthesized from ≥10 and ≤65 wt % of component a), ≥5 and ≤70 wt % of component b), ≥2 and ≤20 wt % of component c), ≥1 and ≤15 wt % of component d), ≥0.5 and ≤6 wt % of component e) and ≥0 and ≤10 wt % of component f), based in each case on the overall mass of the polyurethaneurea, based in each case on the overall mass of the polyurethaneurea, with components a) to f) adding up to 100 wt %.

With more particular preference the polyurethaneurea is synthesized exclusively from components a) to f).

The polyurethaneurea advantageously has a number-average molecular weight $Mn \geq 3000$ and $\leq 50\,000$ g/mol, particularly advantageously $\geq 5000$ and $\leq 30\,000$ g/mol.

For the preparation of the polyurethaneureas, components a), b) and c) and also optionally e) and f) for the preparation of an NCO-terminated prepolymer are preferably introduced initially, in whole or in part, optionally diluted with a solvent which is inert towards isocyanate groups, and heated to temperatures in the range from 50 to 120° C. The preparation of the prepolymers takes place preferably in one step, but may also take place in stages.

Suitable solvents are the customary aliphatic, keto-functional solvents such as acetone, 2-butanone, which may be added not only at the beginning of the preparation but also, optionally, in portions later. Acetone and 2-butanone are preferred, acetone particularly preferred. The addition of other solvents without isocyanate-reactive groups is also possible, preference being given to the use of solvents which are miscible with water.

The isocyanate addition reaction can be accelerated using the catalysts that are known within polyurethane chemistry. In one preferred variant, however, operation takes place without the addition of urethanization catalysts.

In the preparation of the NCO-terminated prepolymers from components a), b) and c) and also, optionally, e) and f), the amount-of-substance ratio of isocyanate groups to isocyanate-reactive groups is generally ≥1.05 and ≤2.5, preferably ≥1.15 and ≤1.95, more preferably ≥1.2 and ≤1.7.

In a subsequent step, the NCO-terminated prepolymer obtained in the first step is preferably then reacted, in whole or in part, with component d) and also, optionally, with components c), e) and f). With preference, component c) is not used; with particular preference, the reaction takes place only with component d). This reaction is referred to generally as chain extension, or as chain termination in the case of component f). The reaction may take place in one step or in stages.

Here, preferably, the NCO-terminated prepolymer is introduced initially and components d) and also, optionally, c), e) and f) are metered in. Components d) and optionally c), e) and f) may also be added in stages in a plurality of steps, more particularly in two steps. Components d) and also, optionally, c), e) and f) may be used in water or organic solvents.

Components d) and also, optionally, c), e) and f) are added preferably at temperatures of 10 to 100° C., preferably 25 to 60° C.

The degree of chain extension, i.e., the molar ratio of NCO-reactive groups of the components d) and also, optionally, c), e) and f) that are used for chain extension and chain termination, to free NCO groups of the prepolymer, is generally ≥25 and ≤150%, preferably ≥50 and ≤120%, more preferably ≥40 and ≤100%.

Where component c) contains potentially cationic groups, these groups may be converted wholly or partly into cationic groups by neutralization, preferably with one of the above-mentioned acids.

The amount of substance of the acid is preferably between 50 and 125 mol %, more preferably between 70 and 100 mol %, of the amount of substance of the groups to be neutralized. The neutralization may take before, during or after the reaction of the NCO-terminated prepolymer.

The polyurethaneurea is preferably obtainable by reaction of components a), b), c) and optionally e) and f) to give an isocyanate-terminated prepolymer, subsequent reaction of the prepolymer with component d) and optionally with components e) and f), and, if component c) comprises a potentially cationic group neutralization of the polyurethaneurea by an acid before, during or after the reaction of the isocyanate-terminated prepolymer with component d) and optionally components e) and f).

A further subject of the invention are aqueous dispersion comprising the polyurethaneurea of the invention.

The dispersing of the polyurethaneurea in water may take place before, during or after the reaction of the NCO-terminated prepolymer. The dispersing may take place during or after the neutralization. The neutralization may also take place simultaneously with the dispersing, with the dispersing water already containing the neutralizing agent.

The dispersing preferably takes place following the reaction of the -NCO terminated prepolymer. For this purpose, the dissolved and chain-extended polyurethane polymer is either introduced into the dispersing water, optionally with vigorous shearing, such as vigorous stirring for example, or else, conversely, the dispersing water is stirred into the chain-extended polyurethane polymer solutions. Preferably the water is added to the dissolved, chain-extended polyurethane polymer.

For preparing the polyurethane dispersion it is possible to use all processes known from the prior art, such as prepolymer mixing processes, acetone processes or melt dispersing processes, for example. The acetone process is preferably employed.

The solvent which is still present in the dispersions after the dispersing step is customarily then removed by distillation. Removal actually in the course of dispersing is likewise possible.

The residual amount of organic solvents in the polyurethaneurea dispersions thus prepared is preferably 0 to 10 wt %, more preferably 0 to 3 wt %, based on the overall dispersion.

The solids fraction of the polyurethaneurea in the polyurethaneurea dispersion of the invention is preferably ≥10 and ≤80 wt %, more preferably ≥15 and ≤60 wt % and very preferably ≥20 and ≤50 wt %, based on the overall weight of the polyurethaneurea dispersion.

The polyurethaneurea dispersion preferably has a viscosity ≥10 and ≤10 000 mPas, more preferably a viscosity ≥50 and ≤1500 mPas, determined by means of rotational viscosimetry in accordance with DIN 53019 at 23° C.

The polyurethaneurea dispersions of the invention may comprise antioxidants and/or light stabilizers and/or other auxiliaries and adjuvants such as, for example, emulsifiers, defoamers, thickeners. Lastly there may also be fillers, plasticizers, pigments, carbon black sols and silica sols, aluminium, clay and asbestos dispersions, flow control agents or thixotropic agents present. Depending on the desired pattern of properties and intended use of the PUR dispersions of the invention, there may be up to 70% of such fillers, based on overall dry matter, in the end product.

Also a subject of the present invention are coating composition comprising the polyurethaneurea of the invention or the aqueous polyurethaneurea dispersion of the invention.

For the use of the PUR dispersions of the invention as coating materials, they are employed either alone or in combination with other aqueous binders. Such aqueous binders may be composed, for example, of polyester, polyacrylate, polyepoxide or polyurethane polymers. Combination with radiation-curable binders, as are described in EP-A-0 753 531, for example, is also possible. It is likewise possible for the PUR dispersions of the invention to be used with other cationic or nonionic PUR dispersions.

A further subject of the invention is also a method for the coating of substrates, characterized in that a coating composition of the invention is applied to a substrate. Likewise subjects of the invention are the coated substrates obtainable by the method of the invention.

Suitable substrates are, for example, woven and nonwoven textiles, leather, paper, hard fibre, straw, paper-like materials, wood, glass, plastics of any of a wide variety of kinds, ceramic, stone, concrete, bitumen, porcelain, metals, or fibres of glass or of carbon.

The substrates are preferably selected from metal, such as, for example, steel, galvanized steel or aluminium, wood, such as, for example, oak, beech, maple or mahogany, or MDF panels (medium-density fibreboard panels), melamine-based substrates or Plexiglas (PMMA, polymethyl methacrylate); especially preferred is wood or MDF panels.

The substrate may be coated by such as spraying, brushing, dipping, flow coating, or using rolls and doctor blades.

The substrate is preferably untreated before the coating is applied.

Following the application of the coating composition to the substrate, drying may take place at the temperatures, customary for 1-component coating systems, of 20° C. to 100° C., preferably of 20° C. to 70° C.

The coatings obtained preferably have a hardness of $\geq 105$ s (König pendulum hardness, determined on glass as specified in the Examples section), more preferably of $\geq 110$ s, and are resistant to chemicals and substances in everyday use such as hand cream, for example, meaning that exposure to these substances does not result in discoloration of the coating or cracks in the coating. The resistance is tested here by the method specified in the Examples section.

The coating compositions of the invention preferably exhibit a very rapid oxidative drying. Furthermore, the coatings obtained preferably have good sandability.

In a first item, the present invention relates to a kationically hydrophilized polyurethaneurea characterized in that it is synthesized from a) at least one aliphatic, araliphatic and/or cycloaliphatic polyisocyanate,
b) polyols having a number-average molecular weight $Mn \geq 400$ and $\leq 6000$ g/mol and a hydroxyl functionality of $\geq 1.5$ and $\leq 4$, comprising at least one polyester polyol b1), which has an amorphous structure and which comprises as synthesis component at least one aromatic dicarboxylic acid and/or the corresponding carboxylic anhydride, the fraction of aromatic dicarboxylic acids and/or their anhydrides in the polyester polyol being $\geq 35$ wt %, based on the overall mass of the polyester polyol,
c) at least one cationically hydrophilizing component which has at least one group that is reactive towards isocyanate groups, and has at least one cationic or potentially cationic group,
d) at least one aliphatic, amino-functional compound which has at least two isocyanate-reactive amino groups,
e) optionally at least one alcohol which has at least two hydroxyl groups and a molar mass $\geq 60$ and $\leq 399$ g/mol and
g) optionally at least one compound which has a group that is reactive towards isocyanate groups.

In a second item, the present invention relates to the polyurethaneurea according to item 1, characterized in that the polyester polyol b1) is obtainable from acid and alcohol components, exclusively aromatic dicarboxylic acids being used as acid component.

In a third item, the present invention relates to the polyurethaneurea according to item 1 or 2, characterized in that the polyester polyol b1) has a Tg$\geq -25°$ C., determined by means of dynamic scanning calorimetry DSC in accordance with DIN EN 61006, Method A.

In a fourth item, the present invention relates to the polyurethaneurea according to any of items 1 to 3, characterized in that component b) comprises not only the polyester polyol b1) but also a further polyester polyol b2) which preferably comprises as synthesis component at least one aliphatic dicarboxylic acid and/or the corresponding carboxylic anhydride.

In a fifth item, the present invention relates to the polyurethaneurea according to item 4, characterized in that component b) consists of a polyester polyol b1), which comprises as acid component exclusively aromatic dicarboxylic acids and/or the corresponding anhydrides, and a polyester polyol b2), which comprises as acid component aliphatic dicarboxylic acids and/or the corresponding anhydrides.

In a sixth item, the present invention relates to the polyurethaneurea according to any of items 1 to 5, characterized in that it has a cationic and/or potentially cationic group content of $\geq 0.2$ and $\leq 5$ milliequivalents per g of polymer.

In a seventh item, the present invention relates to the polyurethaneurea according to any of items 1 to 6, characterized in that component a) comprises $\geq 95$ wt % of isophorone diisocyanate IPDI, based on the overall mass of component a).

In an eighth item, the present invention relates to the polyurethaneurea according to any of items 1 to 7, characterized in that component d) comprises $\geq 95$ wt % of isophoronediamine IPDA, based on the overall mass of component d).

In a ninth item, the present invention relates to the polyurethaneurea according to any of items 1 to 8, characterized in that the polyurethaneurea has no nonionically hydrophilizing groups.

In a tenth item, the present invention relates to the polyurethaneurea according to any of items 1 to 9, characterized in that the polyurethaneurea is obtainable by reaction of components a), b), c) and optionally e) to give an isocyanate-terminated prepolymer, subsequent reaction of the prepolymer with component d) and optionally components e) and f), and, if component c) comprises a potentially cationic group, neutralization of this group by an acid before, during or after the reaction of the isocyanate-terminated prepolymer with component d) and optionally components e) and f).

In an eleventh item, the present invention relates to an aqueous dispersion comprising a polyurethaneurea according to any of items 1 to 10.

In a twelfth item, the present invention relates to a coating composition comprising a polyurethaneurea according to any of items 1 to 10 or an aqueous dispersion according to item 11.

In a thirteenth item, the present invention relates to a method for the coating of substrates, characterized in that a coating composition according to item 12 is applied to a substrate.

In a fourteenth item, the present invention relates to the method according to item 13, characterized in that the substrate is wood or a MDF (medium-density fibreboard) panel.

In a fifteenth item, the present invention relates to a coated substrate obtainable by a method according to item 13 or 14.

The present invention is elucidated using examples, which should not be understood as imposing any restriction. All quantity figures, proportions and percentages are based, unless otherwise specified, on the weight and on the total amount or on the total weight of the compositions.

EXAMPLES

Unless otherwise identified, all percentages are based on the weight.

Unless otherwise noted, all analytical measurements are based on temperatures of 23° C.

The solids contents (non-volatile fraction) were determined according to DIN-EN ISO 3251.

NCO contents, unless expressly stated otherwise, were determined volumetrically in accordance with DIN-EN ISO 11909.

The check for free NCO groups was carried out by means of IR spectroscopy (band at 2260 cm$^{-1}$).

The reported viscosities were determined by means of rotational viscosity according to DIN 53019 at 23° C. using a rotational viscosimeter from Anton Paar Germany GmbH, Ostfildem, D E.

The number-average molecular weight was determined by gel permutation chromatography (GPC) in tetrahydrofuran at 23° C. The procedure here is that of DIN 55672-1: "Gel permeation chromatography, Part 1—Tetrahydrofuran as eluent" (SECurity GPC-System from PSS Polymer Service, flow rate 1.0 ml/min; columns: 2×PSS SDV linear M, 8×300 mm, 5 μm; RID detector). Polystyrene samples of known molar mass are used here for calibration. Calculation of the number-average molecular weight takes place with software assistance. Baseline points and evaluation limits are specified in line with DIN 55672 Part 1.

The glass transition temperature $T_g$ and the melting points was determined by means of dynamic scanning calorimetry (DSC) in accordance with DIN EN 61006, Method A, using a DSC instrument (Pyris Diamond DSC calorimeter from Perkin-Elmer) which for determination of $T_g$ is calibrated with indium and lead. 10 mg of the substance for analysis are weighed out into a sealable aluminium crucible, which is sealed. Three immediately successive runs of a heatings from −100° C. to +150° C. are performed, heating rate 20 K/min, with subsequent cooling, cooling rate 320 K/min, and the third heating curve is used for determining the values. The $T_g$ is defined as the temperature at the mid-height of one glass transition step. The maximum of a melting peak is considered to constitute a melting point.

SUBSTANCES USED AND ABBREVIATIONS

Polyester polyol 1: Polyester polyol from phthalic anhydride and ethylene glycol, $M_n$=2000 g/mol, Tg=21.5° C., amorphous structure
Polyester polyol 2: Polyester polyol from adipic acid and diethylene glycol, $M_n$=2700 g/mol, Tg=−52.5° C., amorphous structure
Polyester polyol 3: Polyester polyol from phthalic anhydride and 1,6-hexanediol, $M_n$=2100 g/mol, Tg=−21.5° C., amorphous structure
Polyester polyol 4: Polyester polyol from adipic acid and hexanediol, $M_n$=2250 g/mol, melting point=60.4° C., crystalline structure
Polyester polyol P5: Polyester polyol from adipic acid and phthalic anhydride (in a weight ratio of 1:1), diethylene glycol and 1,6-hexanediol, $M_n$=2500 g/mol
Polyester polyol P6: Polyester polyol from adipic acid and phthalic anhydride (in a weight ratio of 3:1), diethylene glycol and 1,6-hexanediol, $M_n$=2300 g/mol
BYK 028, BYK 341, BYK 346 Formulating additives; Byk Chemie, Wesel, D E
BdG/H$_2$O 1/1 Mixture of butyl diglycol and H$_2$O 1:1, cosolvent The polyester polyols and IPDI were prepared by Bayer MaterialScience A G, Leverkusen, D E. Other chemicals from Sigma-Aldrich Chemie GmbH. Taufkirchen, D E. Unless otherwise mentioned, the raw materials were used without further purification or pretreatment.

Example 1

Preparation of the Polyurethaneurea Dispersion (Inventive)

216 g of a mixture of polyester polyol 1 P1 and polyester polyol 2 P2 (in a P1/P2 weight ratio of 1/2) were heated to 100° C. and dewatered under reduced pressure for 1 hour. The mixture was then cooled and 61 g of N-methyldiethanolamine and 16 g of 1,4-butanediol were added together with 335 g of acetone. The temperature was adjusted to 50° C. and 255 g of IPDI were added, and the mixture was stirred at 50° C. until the NCO value was slightly below the theoretical figure. The completed prepolymer was reacted with 49 g of IPDA, which was present in solution in 181 g of acetone, at 40° C. The subsequent stirring time was 15 minutes. This was followed by neutralization by addition of 278 g of water and 31 g of 10% strength acetic acid. The stirring time was 30 minutes at 50° C. This was followed by dispersion in 801 g of water at 25° C. over the course of 15 minutes. After that, the solvent was removed by distillation under reduced pressure at 40° C., to give a storage-stable dispersion.
Solids content: 35%
Viscosity: 565 mPas

Example 2

Preparation of the Polyurethaneurea Dispersion (Inventive)

211 g of a mixture of polyester polyol 3 P3 and polyester polyol 2 P2 (in a P3/P2 weight ratio of 1/2) were heated to 100° C. and dewatered under reduced pressure for 1 hour. The mixture was then cooled and 61 g of N-methyldiethanolamine and 16 g of 1,4-butanediol were added together with 335 g of acetone. The temperature was adjusted to 50° C. and 255 g of IPDI were added, and the mixture was stirred at 50° C. until the NCO value was slightly below the theoretical figure. The completed prepolymer was reacted with 49 g of IPDA, which was present in solution in 181 g of acetone, at 40° C. The subsequent stirring time was 15 minutes. This was followed by neutralization by addition of 278 g of water and 31 g of 10% strength acetic acid. The stirring time was 30 minutes at 50° C. This was followed by dispersion in 801 g of water at 25° C. over the course of 15 minutes. After that, the solvent was removed by distillation under reduced pressure at 40° C., to give a storage-stable dispersion.
Solids content: 35%
Viscosity: 880 mPas Example 3

Preparation of the Polyurethanearea Dispersion (Comparative)

189 g of a mixture of polyester polyol 4 P4 and polyester polyol 2 P2 (in a P4/P2 weight ratio of 1/2) were heated to 100° C. and dewatered under reduced pressure for 1 hour. The mixture was then cooled and 61 g of N-methyldiethanolamine and 16 g of 1,4-butanediol were added together with 319 g of acetone. The temperature was adjusted to 50° C. and 255 g of IPDI were added, and the mixture was stirred at 50° C. until the NCO value was slightly below the theoretical figure. The completed prepolymer was reacted with 49 g of IPDA, which was present in solution in 181 g of acetone, at 40° C. The subsequent stirring time was 15 minutes. This was followed by neutralization by addition of 278 g of water and 31 g of 10% strength acetic acid. The stirring time was 30 minutes at 50° C. This was followed by dispersion in 751 g of water at 25° C. over the course of 15 minutes. After that, the solvent was removed by distillation under reduced pressure at 40° C., to give a storage-stable dispersion.
Solids content: 35%
Viscosity: 184 mPas Example 4

Preparation of the Polyurethaneurea Dispersion (Comparative)

235 g of polyester polyol 2 P2 were heated to 100° C. and dewatered under reduced pressure for 1 hour. The mixture was then cooled and 61 g of N-methyldiethanolamine and 16 g of 1,4-butanediol were added together with 346 g of acetone. The temperature was adjusted to 50° C. and 255 g of IPDI were added, and the mixture was stirred at 50° C. until the NCO value was slightly below the theoretical figure. The completed prepolymer was reacted with 49 g of IPDA, which was present in solution in 181 g of acetone, at 40° C. The subsequent stirring time was 15 minutes. This was followed by neutralization by addition of 278 g of water and 31 g of 10% strength acetic acid. The stirring time was 30 minutes at 50° C. This was followed by dispersion in 837 g of water at 25° C. over the course of 15 minutes. After that, the solvent was removed by distillation under reduced pressure at 40° C., to give a storage-stable dispersion.
Solids content: 32%
Viscosity: 2450 mPas Example 5

Preparation of the Polyurethaneurea Dispersion (Comparative, Anionic Hydrophilization)

333 g of a mixture of polyester polyol 1 P1 and polyester polyol 2 P2 (in a P1/P2 weight ratio of 1/2) were heated to 100° C. and dewatered under reduced pressure for 1 hour. The mixture was then cooled and 20 g of dimethylolpropionic acid and 16 g of 1,4-butanediol were added together with 295 g of acetone. The temperature was adjusted to 50° C. and 147 g of IPDI were added, and the mixture was stirred at 50° C. until the NCO value was slightly below the theoretical figure. The completed prepolymer was reacted with 29 g of IPDA, which was present in solution in 106 g of acetone, at 40° C. The subsequent stirring time was 15 minutes. This was followed by neutralization by addition of 162 g of water and 11 g of dimethylethanolamine. The stirring time was 30 minutes at 50° C. This was followed by dispersion in 825 g of water at 25° C. over the course of 15 minutes. After that, the solvent was removed by distillation under reduced pressure at 40° C., to give a storage-stable dispersion.
Solids content: 35%
Viscosity: 79 mPas Example 11

Preparation of the Polyurethaneurea Dispersion (Comparative)

183 g of a mixture of polyester polyol P2 and polyester polyol P3 (in a P2/P3 weight ratio of 1/5) were heated to 100° C. and dewatered under reduced pressure for 1 hour. The mixture was then cooled and 51 g of N-methyldiethanolamine and 13.5 g of 1,4-butanediol were added together with 286 g of acetone. The temperature was adjusted to 50° C. and 212 g of IPDI were added, and the mixture was stirred at 50° C. until the NCO value was slightly below the theoretical figure. The completed prepolymer was reacted with 41 g of IPDA, which was present in solution in 151 g of acetone, at 40° C. The subsequent stirring time was 15 minutes. This was followed by neutralization by addition of 232 g of water and 26 g of 10% strength acetic acid. The stirring time was 30 minutes at 50° C. This was followed by dispersion in 673 g of water at 25° C. over the course of 15 minutes. After that, the solvent was removed by distillation under reduced pressure at 40° C., to give a storage-stable dispersion.
Solids content: 40.5%
Viscosity: 2110 mPas Example 12

Preparation of the Polyurethaneurea Dispersion (Inventive)

186 g of a mixture of polyester polyol P2 and polyester polyol P3 (in a P2/P3 weight ratio of 1/2) were heated to 100° C. and dewatered under reduced pressure for 1 hour. The mixture was then cooled and 51 g of N-methyldiethanolamine and 13.5 g of 1,4-butanediol were added together with 282 g of acetone. The temperature was adjusted to 50° C. and 212 g of IPDI were added, and the mixture was stirred at 50° C. until the NCO value was slightly below the theoretical figure. The completed prepolymer was reacted with 41 g of IPDA, which was present in solution in 151 g of acetone, at 40° C. The subsequent stirring time was 15 minutes. This was followed by neutralization by addition of 232 g of water and 31 g of 10% strength acetic acid. The stirring time was 30 minutes at 50° C. This was followed by dispersion in 678 g of water at 25° C. over the course of 15 minutes. After that, the solvent was removed by distillation under reduced pressure at 40° C., to give a storage-stable dispersion.
Solids content: 39.5%
Viscosity: 680 mPas

Example 13

Preparation of the Polyurethaneurea Dispersion
(Inventive)

188 g of a mixture of polyester polyol P2 and polyester polyol P3 (in a P2/P3 weight ratio of 1/1) were heated to 100° C. and dewatered under reduced pressure for 1 hour. The mixture was then cooled and 51 g of N-methyldiethanolamine and 13.5 g of 1,4-butanediol were added together with 284 g of acetone. The temperature was adjusted to 50° C. and 212 g of IPDI were added, and the mixture was stirred at 50° C. until the NCO value was slightly below the theoretical figure. The completed prepolymer was reacted with 41 g of IPDA, which was present in solution in 151 g of acetone, at 40° C. The subsequent stirring time was 15 minutes. This was followed by neutralization by addition of 232 g of water and 26 g of 10% strength acetic acid. The stirring time was 30 minutes at 50° C. This was followed by dispersion in 683 g of water at 25° C. over the course of 15 minutes. After that, the solvent was removed by distillation under reduced pressure at 40° C., to give a storage-stable dispersion.
Solids content: 38.0%
Viscosity: 316 mPas

Example 14

Preparation of the Polyurethaneurea Dispersion
(Inventive)

192 g of a mixture of polyester polyol P2 and polyester polyol P3 (in a P2/P3 weight ratio of 3/1) were heated to 100° C. and dewatered under reduced pressure for 1 hour. The mixture was then cooled and 51 g of N-methyldiethanolamine and 13.5 g of 1,4-butanediol were added together with 286 g of acetone. The temperature was adjusted to 50° C. and 212 g of IPDI were added, and the mixture was stirred at 50° C. until the NCO value was slightly below the theoretical figure. The completed prepolymer was reacted with 41 g of IPDA, which was present in solution in 151 g of acetone, at 40° C. The subsequent stirring time was 15 minutes. This was followed by neutralization by addition of 232 g of water and 26 g of 10% strength acetic acid. The stirring time was 30 minutes at 50° C. This was followed by dispersion in 690 g of water at 25° C. over the course of 15 minutes. After that, the solvent was removed by distillation under reduced pressure at 40° C., to give a storage-stable dispersion.
Solids content: 38.1%
Viscosity: 422 mPas

Example 15

Preparation of the Polyurethaneurea Dispersion
(Comparative)

145 g of the polyester polyol P5 were heated to 100° C. and dewatered under reduced pressure for 1 hour. The polyol was then cooled and 51 g of N-methyldiethanolamine and 13.5 g of 1,4-butanediol were added together with 259 g of acetone. The temperature was adjusted to 50° C. and 212 g of IPDI were added, and the mixture was stirred at 50° C. until the NCO value was slightly below the theoretical figure. The completed prepolymer was reacted with 41 g of IPDA, which was present in solution in 151 g of acetone, at 40° C. The subsequent stirring time was 15 minutes. This was followed by neutralization by addition of 232 g of water and 26 g of 10% strength acetic acid. The stirring time was 30 minutes at 50° C. This was followed by dispersion in 601 g of water at 25° C. over the course of 15 minutes. After that, the solvent was removed by distillation under reduced pressure at 40° C., to give a dispersion.
Solids content: 35%
Viscosity: 4250 mPas The dispersion was not storage stable. After 2 months storage at room temperature the viscosity increased to 9300 mPas, which makes the dispersion unusable for coatings.

Example 16

Preparation of the Polyurethanearea Dispersion
(Comparative)

180 g of the polyester polyol P6 were heated to 100° C. and dewatered under reduced pressure for 1 hour. The polyol was then cooled and 51 g of N-methyldiethanolamine and 13.5 g of 1,4-butanediol were added together with 280 g of acetone. The temperature was adjusted to 50° C. and 212 g of IPDI were added, and the mixture was stirred at 50° C. until the NCO value was slightly below the theoretical figure. The completed prepolymer was reacted with 41 g of IPDA, which was present in solution in 151 g of acetone, at 40° C. The subsequent stirring time was 15 minutes. This was followed by neutralization by addition of 232 g of water and 26 g of 10% strength acetic acid. The stirring time was 30 minutes at 50° C. This was followed by dispersion in 670 g of water at 25° C. over the course of 15 minutes. After that, the solvent was removed by distillation under reduced pressure at 40° C., to give a storage stable dispersion.
Solids content: 36%
Viscosity: 750 mPas
Trial Applications:
Production of Wood Coatings:

A coating composition was produced from the substances specified in Table 1 (amounts in wt %) by mixing at room temperature. It was not possible to formulate a coating composition based on the polyurethaneurea from Example 5 without using a cosolvent. In the case of an analogous formulation without cosolvent, no complete and homogeneous films were obtained on wood. Therefore, Example 10 was formulated with butyl diglycol as cosolvent.

TABLE 1

| Components | Ex. 6 | Ex. 7 | Ex. 8 | Ex. 9 | Ex. 10 |
| --- | --- | --- | --- | --- | --- |
| Ex. 1 | 93.7 | | | | |
| Ex. 2 | | 92.2 | | | |
| Ex. 3 | | | 93.1 | | |
| Ex. 4 | | | | 98.4 | |
| Ex. 5 | | | | | 87.9 |
| BYK 028 | 1.0 | 1.0 | 1.0 | 1.0 | 1.0 |
| BYK 341 | 0.4 | 0.4 | 0.4 | 0.4 | 0.4 |
| BYK 346 | 0.2 | 0.2 | 0.2 | 0.2 | 0.2 |
| Water | 4.7 | 4.7 | 5.3 | | |
| BdG/Water 1/1 | | | | | 10.5 |

TABLE 4

| Components | Ex. 17 | Ex. 18 | Ex. 19 | Ex. 20 | Ex. 21 |
| --- | --- | --- | --- | --- | --- |
| Ex. 11 | 81.09 | | | | |
| Ex. 12 | | 82.87 | | | |
| Ex. 13 | | | 86.26 | | |

TABLE 4-continued

| Components | Ex. 17 | Ex. 18 | Ex. 19 | Ex. 20 | Ex. 21 |
|---|---|---|---|---|---|
| Ex. 14 | | | | 85.87 | |
| Ex. 16 | | | | | 91.68 |
| BYK 028 | 0.86 | 0.87 | 0.91 | 0.91 | 0.97 |
| BYK 341 | 0.34 | 0.35 | 0.36 | 0.36 | 0.39 |
| BYK 346 | 0.17 | 0.17 | 0.18 | 0.18 | 0.19 |
| Water | 17.54 | 15.73 | 12.28 | 12.68 | 6.77 |

Methods:

Determination of the Pendulum Hardness According to König

The coating compositions were applied to glass, to give a dried-film thickness of approximately 15 µm. The films were then dried at room temperature for 10 minutes and then at 60° C. for 16 hours.

The König pendulum hardness was determined according to DIN 53157/DIN EN ISO 1522.

Determination of the Gloss

The coating compositions were applied to a black plexiglass with a 200 µm wet film thickness. The films were first dried for 4 hours at room temperature and then at at 60° C. for 16 hours. After cooling to room temperature the gloss was measured according to DIN EN ISO 2813 using a BYK-Gardner reflectometer.

Resistance to Hand Cream

The resistance to hand cream was determined to DIN EN 12720:2009-07. Two coats of the coating compositions, each of 120 g/m², were applied to a beech board and dried at 50° C. for 44 hours. The treated surface was evaluated 16 hours after treatment, in accordance with the following scale:

Rating 5: No visible changes (no damage).
Rating 4: Slight alteration in gloss or hue, visible only if the light source is mirrored in the test surface on or very close to the marking and is reflected directly to the eye of the observer, or several markings which are just perceptible and are delimited from one another.
Rating 3: Slight marking visible from a number of viewing angles; for example, an almost complete circle or circular area that is just perceptible.
Rating 2: Severe marking; the surface structure is damaged, but the film is not entirely gone.
Rating 1: Severe marking; the surface structure is altered or the surface material is partly destroyed, or the filter paper adheres to the surface. On scratching, the film is removed (down to wood)
Rating 0: Very severe marking; the surface structure is altered or the surface material is wholly or partly destroyed, or the filter paper adheres to the surface.

Sandability:

The coating composition was applied in the form of films 500 µm thick to an untreated Sapelli mahogany board and dried at room temperature for 4 hours. The sandability was then tested using 320 grade sandpaper, by drawing the sandpaper over the coating ten times. On the basis of the scale below, an evaluation was made of whether sandability was possible and of how resistant the coating was to the sandpaper. Likewise considered was whether a deposit was formed on the sandpaper.

Evaluation took place according to the following scale:

0: Excellent, excellent sandability and no deposit on the sandpaper,
1: Good, good sandability and slight deposit on the sandpaper,
2: Average; average sandability and moderate deposit on the sandpaper,
3: Below average; below-average sandability and considerable deposit on the sandpaper,
4: Poorly sandable
5: Unsandable Drying Time:

The drying times were determined on the basis of DIN 53150. The coating compositions were applied as films with a thickness of 120 µm to a glass plate, and the drying time at room temperature was determined according to the criteria T1 (based on DIN EN ISO 1517) and T4.

T1: 0.5 g of glass beads as per DIN 1517 were distributed over the film from a height of between 50 and 150 mm. After 10 seconds, the glass plate was inclined by 20° and an attempt was made to remove the glass beads with a brush. T1 is achieved if all of the glass beads fall from the surface without leaving tracks or imprints.

T4: Placed onto the film in succession were a paper disc (diameter 26 mm and weight 60 to 80 g/m²), a rubber disc (diameter 22 mm, height 5 mm, hardness 50±5 IRHD to DIN ISO 48) and a weight of 2 kg. After 60 seconds weight and rubber disc were removed. The substrate with the coating composition and the paper is then dropped from a height of approximately 30 mm onto a wooden board with a thickness of 20 mm. If the paper detaches during this procedure, T4 has been achieved.

Comparison of Examples 6 (Inventive) and 10 (Comparative, Anionic Hydrophilization)

The inventive coating composition of Example 6 had a T1 drying time of 30 minutes and a T4 drying time of 46 to 56 minutes. The comparative composition of Example 10 a T1 drying time of 47 minutes and T4 drying time of 71 minutes to 77 minutes, and its drying was therefore substantially slower.

Moreover, the composition of Example 10 had a much lower hardness than that of Example 6. The results are summarized in Table 2.

TABLE 2

| Drying conditions | Ex. 6, pendulum hardness (s) | Ex. 10, pendulum hardness (s) |
|---|---|---|
| 1 d at room temperature | 120 | 27 |
| 4 d at room temperature | 141 | 27 |
| 7 d at room temperature | 145 | 29 |
| 8 d at room temperature | 147 | 29 |
| 16 h at 50° C. | 144 | 29 |
| 7 d at room temperature + 16 h at 50° C. | 144 | 30 |

Comparison of Examples 6 to 9

The coating compositions of Examples 6 to 9 were tested for their hardness, resistance and sandability.

The results of the investigations are summarized in Table 3. It was clearly apparent that comparative composition 8 exhibited distinct disadvantages in resistance and sandability, and comparative composition 9 exhibited disadvantages in pendulum hardness and sandability, relative to the inventive compositions.

TABLE 3

|  | Ex. 6 | Ex. 7 | Ex. 8 (C) | Ex. 9 (C) |
|---|---|---|---|---|
| Pendulum hardness (s) after 1 d RT | 120 | 118 | 120 | 98 |
| Pendulum hardness (s) after 3 d RT | 141 | 131 | 127 | 98 |
| Pendulum hardness (s) after 16 h at 50° C. | 144 | 128 | 137 | 97 |
| Hand cream resistance | 5 | 5 | 3 | 5 |
| Sandability | 1-2 | 1-2 | 2 | 2 |

Comparison of Examples 17 to 21

The coating compositions of Examples 17 to 21 were tested for their hardness, resistance and sandability employing the methods described above.

The results of the investigations are summarized in Table 5. It was clearly apparent that the comparative composition 17 exhibited distinct disadvantages in the gloss, resistance and sandability, and the comparative composition 21 exhibited a lower pendulum hardness relative to the inventive composition 1.

TABLE 5

|  |  | Ex. 1 | Ex. 17 | Ex. 18 | Ex. 19 | Ex. 20 | Ex. 21 |
|---|---|---|---|---|---|---|---|
| Weight ratio P2/P3 |  | 2:1 | 1:5 | 1:2 | 1:1 | 3:1 | P6* |
| Gloss (%) | 20° | 49 | 36 | 42 | 62 | 67 | 55 |
|  | 60° | 89 | 91 | 91 | 90 | 84 | 88 |
| König pendulum hardness (s) | 1 d at RT | 120 | 98 | 97 | 106 | 104 | 120 |
|  | 4 d at RT | 141 | 113 | 127 | 120 | 102 | 123 |
|  | 8 d at RT | 147 | 132 | 142 | 137 | 104 | 135 |
|  | 16 h at 50° C. | 144 | 141 | 131 | 123 | 99 | 126 |
| Hand cream resistance |  | 5 | 1 | 5 | 1 | 1 | 5 |
| Sandability |  | 1-2 | 3 | 1 | 1-2 | 1-2 | 1-2 |

*In this case polyesterpolyol P6 comprising adipinic acid and phthalic acid in the weight ratio of example 20 was used General Discussion The usefulness of polyurethaneurea dispersions depends on two parameters:

(i) The viscosity of the dispersion must be sufficiently low in order to allow the application of the dispersion. Moreover, the viscosity must be stable over longer periods of time in order to achieve a sufficient storage stability.

(ii) The properties of the coating produced with the dispersions must meet certain standards with regard to hardness, resistance against chemical substances and sandability.

On the one hand, these properties depend on the ratio of aliphatic to aromatic polyester polyols. Low ratios of aliphatic to aromatic polyester polyols as seen in example 17 lead to deficiencies in gloss and sandability. In addition to this, the viscosity of the dispersions might become too high (data not shown). Coatings made from dispersions with high ratios of aliphatic to aromatic polyester polyols in the polyurethaneurea tend to be too soft. Therefore, a ratio between aliphatic and aromatic polyester polyols in the polyurethaneurea between 1:2 and 2:1 or 3:1 gives the best results.

The coating of example 18 displayed decreased hand cream resistance. However, resistance against other substances such as water, ethanol (48%), coffee or red wine was comparable to examples 17 to 20 (data not shown).

On the other hand, the study underlying the present invention surprisingly shows that not only the weight ratio between aliphatic and aromatic polyester polyols plays an important role in determining the properties of the dispersion. Viscosity and stability of the dispersion critically depend on the question if the two different carboxylic acids are combined in one polyester polyol or separated between two different polyester polyols.

Example 14 employs one purely aliphatic polyester polyol and a second purely aromatic polyester polyol in a weight ratio of 1:1. Example 15 employs a single polyester polyol P5 which comprises aromatic and aliphatic carboxylic acids in a weight ratio of 1:1. Thus, example 14 employs two polyester polyols, while example 15 employs a single mixed polyester polyol. Despite this seemingly small difference, dispersions prepared with the polyurethaneurea of example 15 have a far higher viscosity (4250 mPas) than the dispersion of example 14 (422 mPas). Moreover, the dispersion of example 15 was not stable. Thus, the separation of aliphatic and aromatic carboxylic acids in two polyester polyols is a key feature for achieving low viscosities.

The invention claimed is:

1. A cationically hydrophilized polyurethaneurea synthesized from
   a) ≥20 and ≤55 wt % of at least one aliphatic, araliphatic and/or cycloaliphatic polyisocyanate selected from HDI, H12-MDI and/or IPDI,
   b) ≥20 and ≤50 wt % of polyols having a number-average molecular weight Mn≥400 and ≤6000 g/mol and a hydroxyl functionality of ≥1.5 and ≤4,
      (i) comprising at least one polyester polyol b1), which has an amorphous structure and which comprises exclusively aromatic dicarboxylic acids and/or the corresponding carboxylic anhydrides as acid component, the fraction of aromatic dicarboxylic acids and/or their anhydrides in the polyester polyol being ≥35 wt %, based on the overall mass of the polyester polyol, and
      (ii) comprising at least one polyester polyol b2), which comprises exclusively aliphatic dicarboxylic acids and/or the corresponding carboxylic anhydrides as acid component,
      wherein the weight ratio between polyester polyol b1) and polyester polyol b2) is between 2:1 and 1:3;
   c) ≥5 and ≤15 wt % of at least one cationically hydrophilizing component selected from N,N'-bis(hydroxyalkyl)alkylamines,
   d) ≥2 and ≤12 wt % of at least one aliphatic, aminofunctional compound which has at least two isocyanate-reactive amino groups, comprising ≥95 wt % of isophoronediamine IPDA, based on the overall mass of component d),
   e) ≥1 and ≤4 wt % of optionally at least one alcohol which has at least two hydroxyl groups and a molar mass ≥60 and ≤399 g/mol and
   f) ≥0 and ≤10 wt % of at least one compound which has a group that is reactive towards isocyanate groups, based in each case on the overall mass of the polyurethaneurea, based in each case on the overall mass of the polyurethaneurea, with components a) to f) adding up to 100 wt %.

2. The polyurethaneurea according to claim 1, wherein the polyester polyol b1) has a Tg≥−25° C., determined by dynamic scanning calorimetry DSC in accordance with DIN EN 61006, Method A.

3. The polyurethaneurea according to claim 1, wherein the polyurethaneurea has a cationic and/or potentially cationic group content of ≥0.2 and ≤5 milliequivalents per g of polyurethaneurea.

4. The polyurethaneurea according to claim 1, wherein component a) comprises ≥95 wt % of isophorone diisocyanate IPDI, based on the overall mass of component a).

5. The polyurethaneurea according to claim 1, wherein the polyurethaneurea has no nonionically hydrophilizing groups.

6. The polyurethaneurea according to claim 1, wherein the polyurethaneurea is obtained by reaction of components a), b), c) and optionally e) to give an isocyanate-terminated prepolymer, subsequent reaction of the prepolymer with component d) and optionally components e) and f), and, if component c) comprises a potentially cationic group, neutralization of this group by an acid before, during or after the reaction of the isocyanate-terminated prepolymer with component d) and optionally components e) and f).

7. An aqueous dispersion comprising the polyurethaneurea according to claim 1.

8. A coating composition comprising the polyurethaneurea according to claim 1 or an aqueous dispersion comprising the polyurethaneurea according to claim 1.

9. A method for the coating of substrates, comprising applying a coating composition according to claim 8 to a substrate.

10. The Method according to claim 9, wherein the substrate is wood or an MDF (medium-density fibreboard) panel.

11. A coated substrate obtained by the method according to claim 9.

12. The polyurethaneurea according to claim 1, wherein the weight ratio between polyester polyol b1) and polyester polyol b2) is between 1:2 to 2:1.

* * * * *